United States Patent
Chan et al.

(10) Patent No.: US 9,159,981 B2
(45) Date of Patent: Oct. 13, 2015

(54) ARRAY-TYPE BATTERY POWER MANAGEMENT APPARATUS AND BATTERY POWER INTEGRATION UNITS THEREOF

(75) Inventors: Chih-Chiang Chan, Taoyuan County (TW); Miao-Jen Cheng, Taoyuan County (TW)

(73) Assignee: DELTA ELECTRONICS, INC., Taoyuan County (TW)

( * ) Notice: Subject to any disclaimer, the term of this patent is extended or adjusted under 35 U.S.C. 154(b) by 781 days.

(21) Appl. No.: 13/396,357

(22) Filed: Feb. 14, 2012

(65) Prior Publication Data

US 2013/0093397 A1  Apr. 18, 2013

(30) Foreign Application Priority Data

Oct. 14, 2011 (TW) .............................. 100219285 U (51) Int. Cl.
  *H02J 7/00* (2006.01)
  *H01M 2/20* (2006.01)
  *H01M 2/30* (2006.01)
  *H01M 10/42* (2006.01)

(52) U.S. Cl.
  CPC ................ *H01M 2/202* (2013.01); *H01M 2/30* (2013.01); *H01M 10/425* (2013.01); *H02J 7/0022* (2013.01); *H02J 7/0042* (2013.01)

(58) Field of Classification Search
  CPC ..................................................... H01M 2/202
  USPC .......... 320/107, 127, 128; 307/43, 44, 45, 46, 307/48, 64–66
  See application file for complete search history.

(56) References Cited

U.S. PATENT DOCUMENTS

| | | | |
|---|---|---|---|
| 7,495,415 B2 * | 2/2009 | Kanouda et al. | 320/112 |
| 8,264,204 B2 * | 9/2012 | Nagaoka et al. | 320/136 |
| 8,384,244 B2 * | 2/2013 | Peterson et al. | 307/66 |
| 2011/0273132 A1 * | 11/2011 | Khaitan et al. | 320/101 |
| 2012/0244398 A1 * | 9/2012 | Youngs et al. | 429/61 |

* cited by examiner

*Primary Examiner* — Richard V Muralidar
(74) *Attorney, Agent, or Firm* — Muncy, Geissler, Olds & Lowe, P.C.

(57) ABSTRACT

An array-type battery power management apparatus includes at least two battery power management apparatuses. Each battery power management apparatus has a bus unit and at least one battery power integration unit. The battery power integration unit has a battery module and a charging-discharging module. The battery module has a first positive conductive terminal and a first negative conductive terminal. The charging-discharging module has a second positive conductive terminal and a second negative conductive terminal. The second positive conductive terminal is directly connected to the first positive conductive terminal and the second negative conductive terminal is directly connected to the first negative conductive terminal, thus directly electrically connecting to the battery module and the charging-discharging module.

10 Claims, 6 Drawing Sheets

ARRAY-TYPE BATTERY POWER MANAGEMENT APPARATUS AND BATTERY POWER INTEGRATION UNITS THEREOF

BACKGROUND OF THE INVENTION

1. Field of the Invention

The present invention relates generally to a battery power management apparatus and a battery module and a charging-discharging module thereof, and more particularly to an array-type battery power management apparatus and a battery power integration unit thereof.

2. Description of Prior Art

Uninterruptible power supply (UPS), as the name indicates, is an electrical apparatus that provides emergency power to a load when the input power source, typically mains power, fails. Because the UPS is more complicated and more expensive than other emergency power apparatuses, the UPS is usually provided to protect important equipment, such as computer equipment, monitor instruments, fire equipment, medical instruments, and so on, thus achieving strict power requirements for the above-mentioned equipment and instruments.

Figure 1:
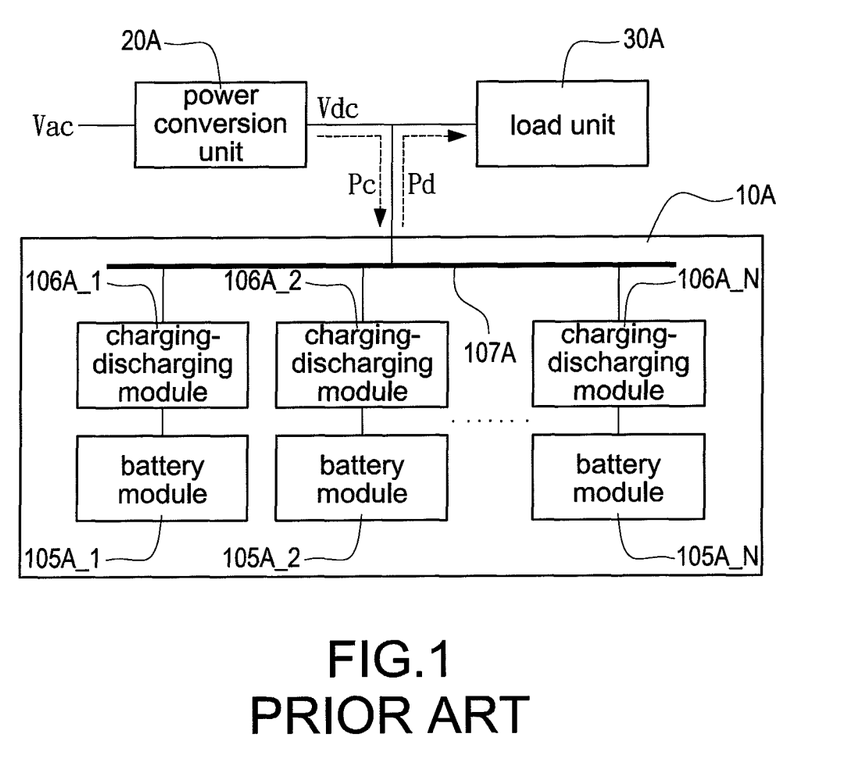
FIG. 1 is a schematic block diagram of providing charging and discharging operations of a prior art battery power management apparatus.

Reference is made to FIG. 1 which is a schematic block diagram of providing charging and discharging operations of a prior art of battery power management apparatus. The battery power management apparatus 10A acts as a role of an uninterrupted power-supplying apparatus. When an external AC voltage source Vac normally supplies power, the external AC voltage source Vac is converted into an external DC voltage source Vdc by a power conversion unit 20A. In the operation condition, the external DC voltage source Vdc is provided to supply a load unit 30A. Also, the external DC voltage source Vdc can charge the battery power management apparatus 10A to store electric energy via a charging path Pc. On the other hand, the battery power management apparatus 10A supplies the load unit 30A via a discharging path Pd when the external AC voltage source Vac cannot supply power normally. Accordingly, the load unit 30A can be normally supplied whether the external AC voltage source Vac is normal or abnormal.

As shown in FIG. 1, the battery power management apparatus 10A has a plurality of battery modules 105A_N and a plurality of charging-discharging modules 106A_N. Each battery module 105A_N is electrically connected to the corresponding charging-discharging module 106A_N. Afterward, the connected battery modules 105A_N and the corresponding charging-discharging modules 106A_N are electrically in parallel via a bus unit 107A. That is, a first battery module 105A_1 is electrically connected to a first charging-discharging module 106A_1, a second battery module 105A_2 is electrically connected to a second charging-discharging module 106A_2, and so on. Finally, the charging-discharging modules 106A_N are electrically connected to the bus unit 107A to provide charging and discharging operations of the battery power management apparatus 10A.

Note that, the battery modules 105A_N and the charging-discharging modules 106A_N can be separately operated before electrically connecting to each other. Hence, the integrated battery modules and charging-discharging modules can provide charging and discharging operations when the battery modules 105A_N are electrically connected to the corresponding charging-discharging modules 106A_N. In particular, the battery modules 105A_N and the charging-discharging modules 106A_N are electrically connected to each other via electric wires or copper buses. Furthermore, the prior art battery power management apparatus 10A usually has only one set of battery module and charging-discharging module. Also, the battery power management apparatus 10A cannot be operated once the battery module or the charging-discharging module is in fault. Hence, in order to replace or repair the abnormal battery module or charging-discharging module, the whole system has to be in shutdown. Furthermore, the battery power management apparatus 10A probably cannot provide sufficient output power to the load unit 30A once the battery module or the charging-discharging module is in fault so that the whole system is abnormally operated.

Accordingly, it is desirable to provide an array-type battery power management apparatus and battery power integration units thereof to save wire material costs, simplify wire process, provide flexible electric energy control, and provide redundant power, thus maintaining the normal power supply when any one of the battery power management apparatuses is in fault.

SUMMARY OF THE INVENTION

An object of the invention is to provide a battery power integration unit to solve the above-mentioned problems.

The battery power integration unit includes a battery module and a charging-discharging module. The battery module has a first positive conductive terminal and a first negative conductive terminal. The first positive conductive terminal and the first negative conductive terminal are separated by a first distance. The charging-discharging module has a second positive conductive terminal and a second negative conductive terminal. The second positive conductive terminal and the second negative conductive terminal are separated by a second distance. The first distance is substantially equal to the second distance so that the second positive conductive terminal is directly connected to the first positive conductive terminal and the second negative conductive terminal is directly connected to the first negative conductive terminal, thus electrically connecting the battery module to the charging-discharging module.

Another object of the invention is to provide an array-type battery power management apparatus to solve the above-mentioned problems.

The array-type battery power management apparatus includes at least two battery power management apparatuses. Each battery power management apparatus includes a bus unit and at least one battery power integration unit. The bus unit has a positive bus and a negative bus. The battery power integration unit has a battery module and a charging-discharging module. The battery module has a first positive conductive terminal and a first negative conductive terminal. The first positive conductive terminal and the first negative conductive terminal are separated by a first distance. The charging-discharging module has a second positive conductive terminal and a second negative conductive terminal. The second positive conductive terminal and the second negative conductive terminal are separated by a second distance. The first distance is substantially equal to the second distance so that the second positive conductive terminal is directly connected to the first positive conductive terminal and the second negative conductive terminal is directly connected to the first negative conductive terminal, thus electrically connecting the battery module to the charging-discharging module. The first positive conductive terminal of the battery module and the second positive conductive terminal of the charging-discharging module are electrically connected to the positive bus of the bus unit. The first negative conductive terminal of the battery module and the second negative conductive terminal of the charging-discharging module are electrically connected to the negative bus of the bus unit. Also, each battery power management apparatus provides an output power which is greater than or equal to required power of the external load unit.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Reference will now be made to the drawing figures to describe the present invention in detail.

An array-type battery power management apparatus is disclosed. The array-type battery power management apparatus includes at least two battery power management apparatuses. Each battery power management apparatus has a bus unit and at least one battery power integration unit. The bus unit has a positive bus and a negative bus. The battery power integration unit has a battery module and a charging-discharging module. The battery module has a first positive conductive terminal and a first negative conductive terminal. The charging-discharging module has a second positive conductive terminal and a second negative conductive terminal. The second positive conductive terminal is electrically connected to the first positive conductive terminal to provide an electrical connection between the battery module and the charging-discharging module, thus forming an integrated module structure of the battery module and the charging-discharging module. In particular, the first positive conductive terminal of the battery module and the second positive conductive terminal of the charging-discharging module are electrically connected to the positive bus of the bus unit. The first negative conductive terminal of the battery module and the second negative conductive terminal of the charging-discharging module are electrically connected to the negative bus of the bus unit.

Figure 2:
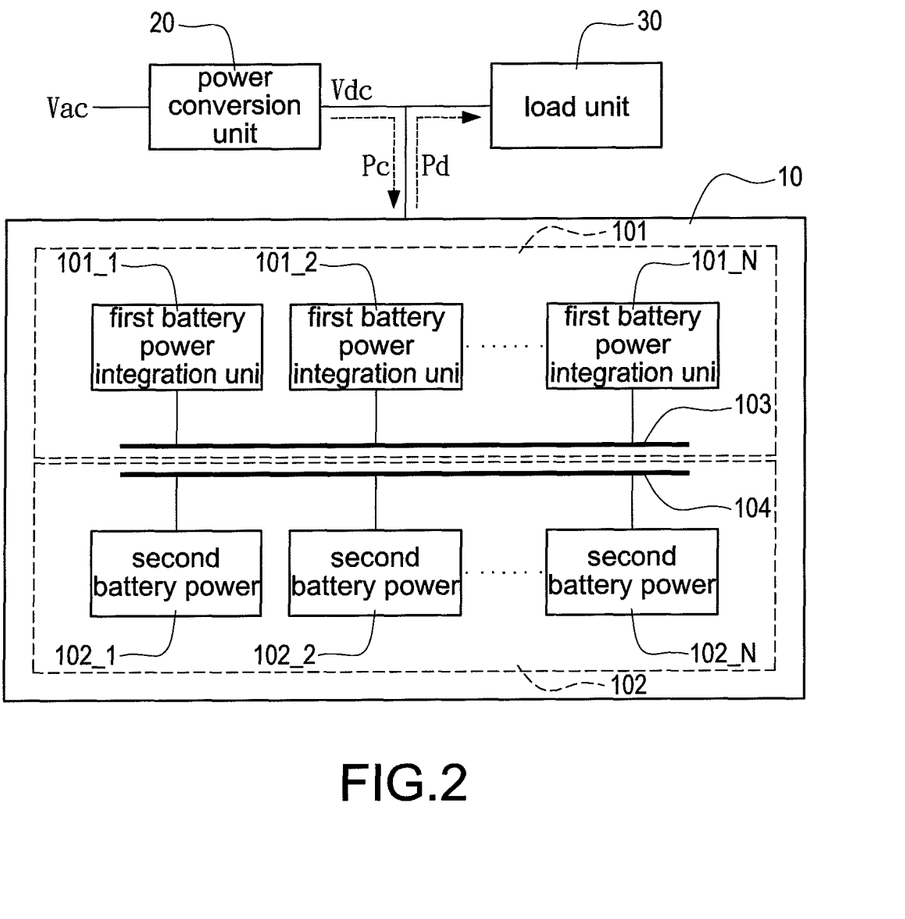
FIG. 2 is a schematic block diagram of an array-type battery power management apparatus under a charging and discharging operation according to the present invention.

For the convenience of explanation, the array-type battery power management apparatus 10 includes two battery power management apparatuses 101,102. Reference is made to FIG. 2 which is a schematic block diagram of an array-type battery power management apparatus under a charging and discharging operation according to the present invention. The battery power management apparatus 101 has at least one battery power integration unit 101_1~101_N and a bus unit 103; the battery power management apparatus 102 has at least one battery power integration unit 102_1~102_N and a bus unit 104. As mentioned above, each battery module is connected to the corresponding charging-discharging module via the positive conductive terminals and negative conductive terminals thereof, thus providing an electrical connection between the battery module and the charging-discharging module to form an integrated module structure of the battery module and the charging-discharging module. Note that, the positive conductive terminal of the battery module is locked to the positive conductive terminal of the charging-discharging module by a screw and the negative conductive terminal of the battery module is locked to the negative conductive terminal of the charging-discharging module by a screw to integrate the battery module and the charging-discharging module. Especially to deserve to be mentioned, each of the battery power management apparatuses is designed in a 1 U height (about four centimeters).

Figure 3:
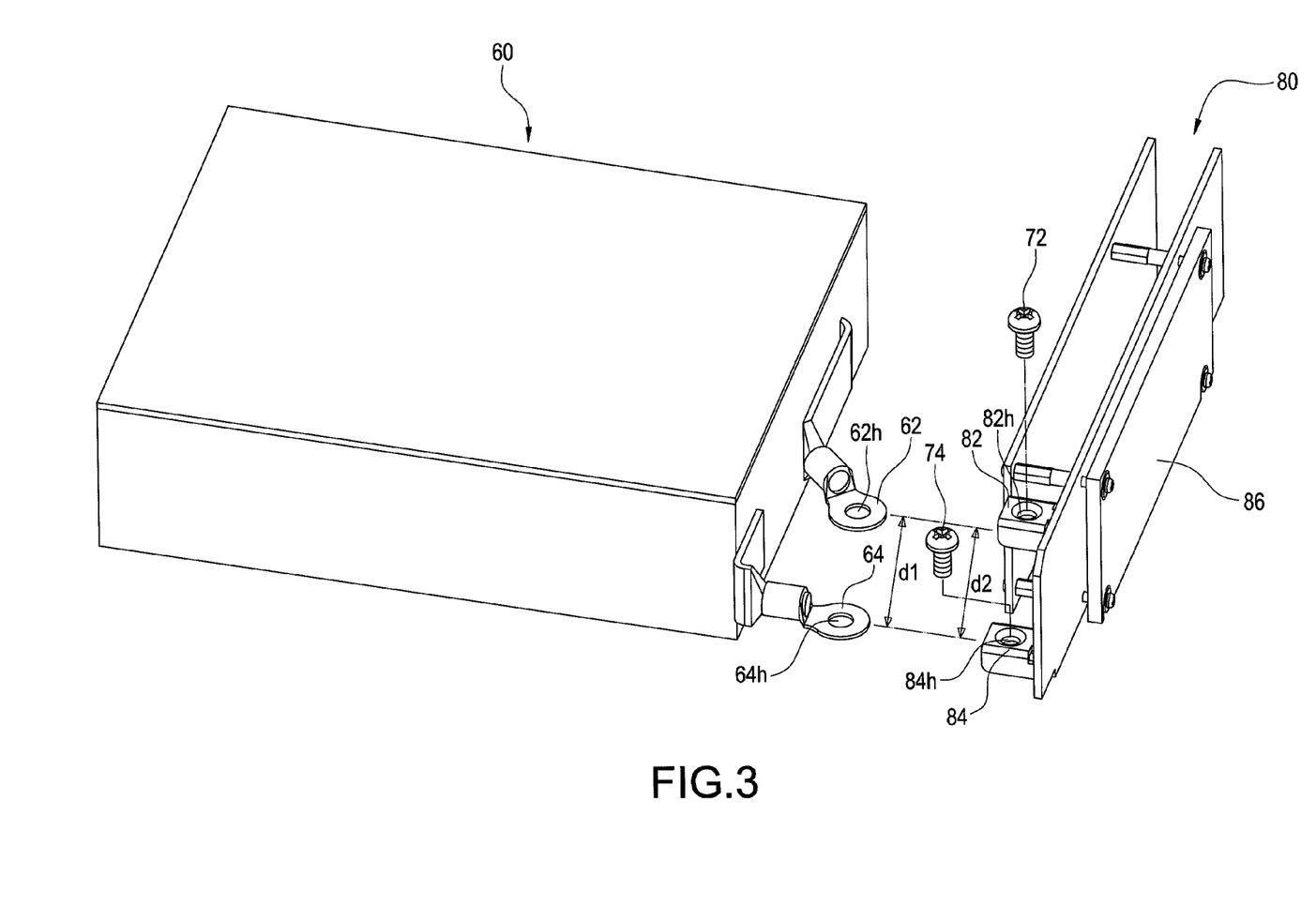
FIG. 3 is an exploded view of a battery module and a charging-discharging module of a battery power integration unit according to the present invention.
Figure 4:
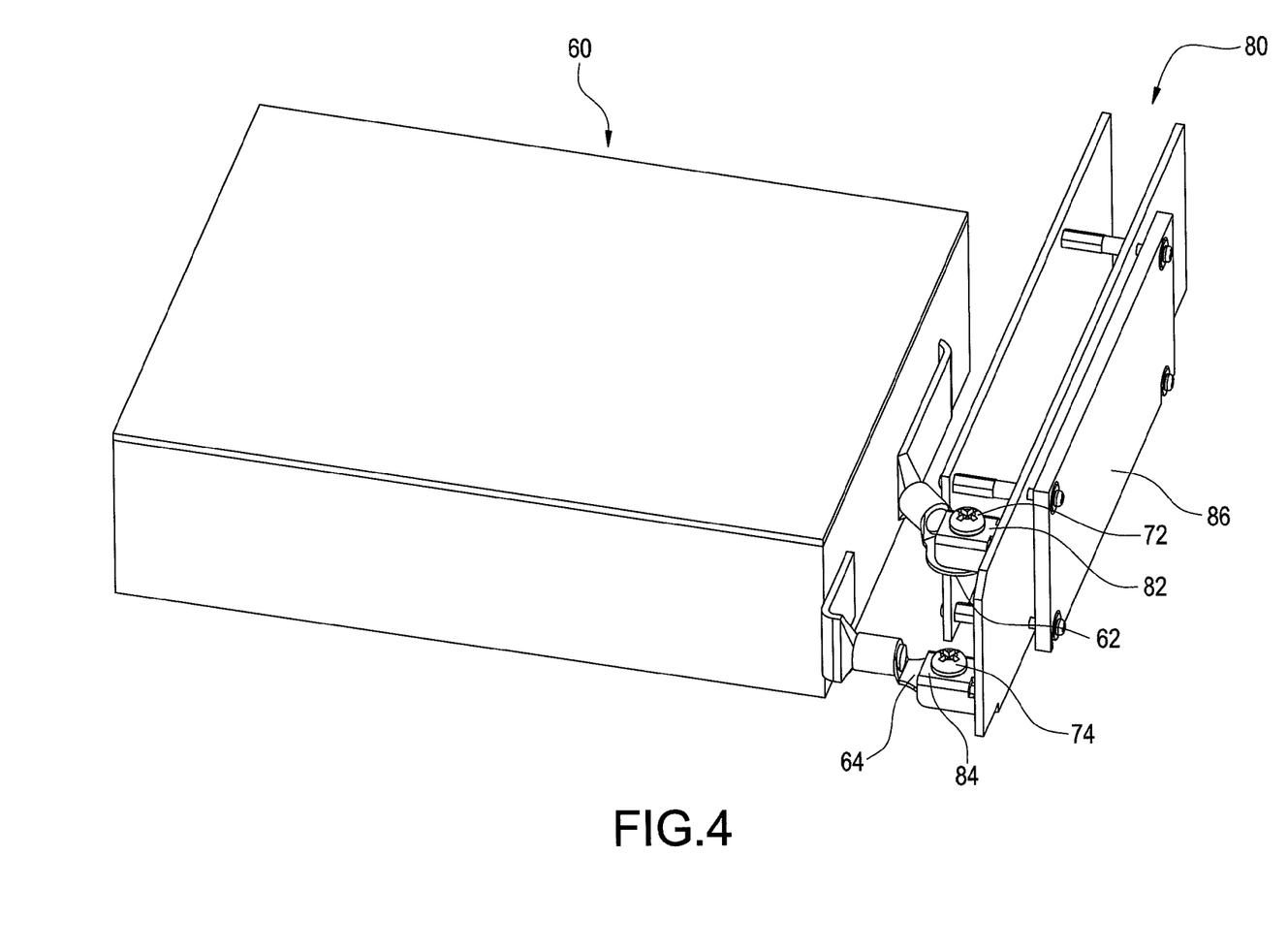
FIG. 4 is an assembled view of the battery module and the charging-discharging module of the battery power integration unit according to the present invention.

Reference is made to FIG. 3 and FIG. 4 which are an exploded view and an assembled view of the battery module and the charging-discharging module of the battery power integration unit according to the present invention, respectively. Only one battery module and one charging-discharging module are illustrated in FIG. 3. Obviously, the battery module 60 has a positive conductive terminal 62 and a negative conductive terminal 64; the charging-discharging module 80 has a positive conductive terminal 82 and a negative conductive terminal 84. The positive conductive terminal 62 and the negative conductive terminal 64 of the battery module 60 are separated by a first distance d1; the positive conductive terminal 82 and the negative conductive terminal 84 of the charging-discharging module 80 are separated by a second distance d2. Note that, the second distance d2 is substantially equal to the first distance d1. The first positive conductive terminal 62 of the battery module 60 has a through hole 62h and the second positive conductive terminal 82 of the charging-discharging module 80 has a through hole 82h; a screw 72 penetrates through the through holes 62h, 82h to lock the through holes 62h, 82h. The first negative conductive terminal 64 of the battery module 60 has a through hole 64h and the second negative conductive terminal 84 of the charging-discharging module 80 has a through hole 84h; a screw 74 penetrates through the through holes 64h, 84h to lock the through holes 64h, 84h. Accordingly, the battery module 60 and the charging-discharging module 80 are combined to form the battery power integration unit. In particular, the battery power integration unit further has a heat-dissipating unit 86 which is disposed on the charging-discharging module 80.

As shown in FIG. 2, the battery power management apparatus 10 acts as a role of an uninterrupted power-supplying apparatus. When an external AC voltage source Vac normally supplies power, the external AC voltage source Vac is converted into an external DC voltage source Vdc by a power conversion unit 20. In the operation condition, the external DC voltage source Vdc is provided to supply a load unit 30. Also, the external DC voltage source Vdc can charge the array-type battery power management apparatus 10 to store electric energy via a charging path Pc. On the other hand, the array-type battery power management apparatus 10 supplies the load unit 30 via a discharging path Pd when the external AC voltage source Vac cannot normally supply power. Accordingly, the load unit 30 can be normally supplied whether the external AC voltage source Vac is normal or abnormal.

Especially to deserve to be mentioned, the positive buses of the bus units 103, 104 are electrically connected to a positive terminal of the external DC voltage Vdc and a positive terminal of an external load unit 30. The negative buses of the bus units 103, 104 are electrically connected to a negative terminal of the external DC voltage Vdc and a negative terminal of the external load unit 30. In particular, the positive buses and the negative buses of the bus units 103, 104 are copper bus bars, respectively. Hence, the bus units 103, 104 provide bi-directional charging path Pc and discharging path Pd. The charging-discharging module 80 receives the external DC voltage Vdc and converts a voltage level of the external DC voltage Vdc to charge the battery module 60 via the positive bus and the negative bus when the battery module 60 provides a charging operation. In particular, the charging-discharging module 80 is a DC-DC converter for providing a step-up or step-down operation of the external DC voltage Vdc or the battery voltage. In this embodiment, the charging-discharging module 80 converts a 12-volt external DC voltage Vdc into a 21-volt charging voltage for the battery module 60. The charging-discharging module 80 receives a battery voltage provided from the battery module 60 and converts a voltage level of the battery voltage to supply an external load unit 30 via the positive bus and the negative bus when the battery module 60 provides a discharging operation.

Figure 5:
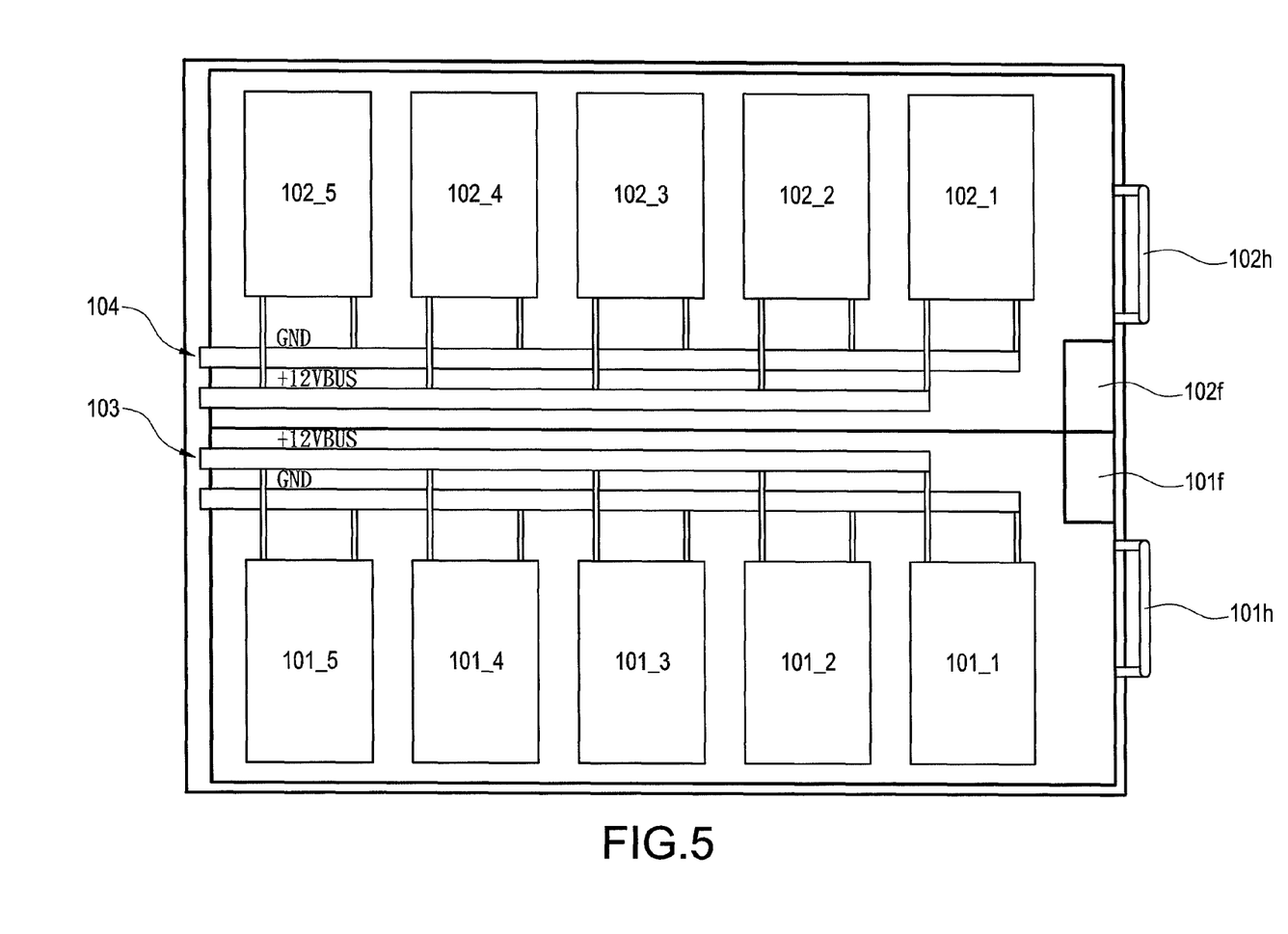
FIG. 5 is a schematic view of the array-type battery power management apparatus according to the present invention.
Figure 6:
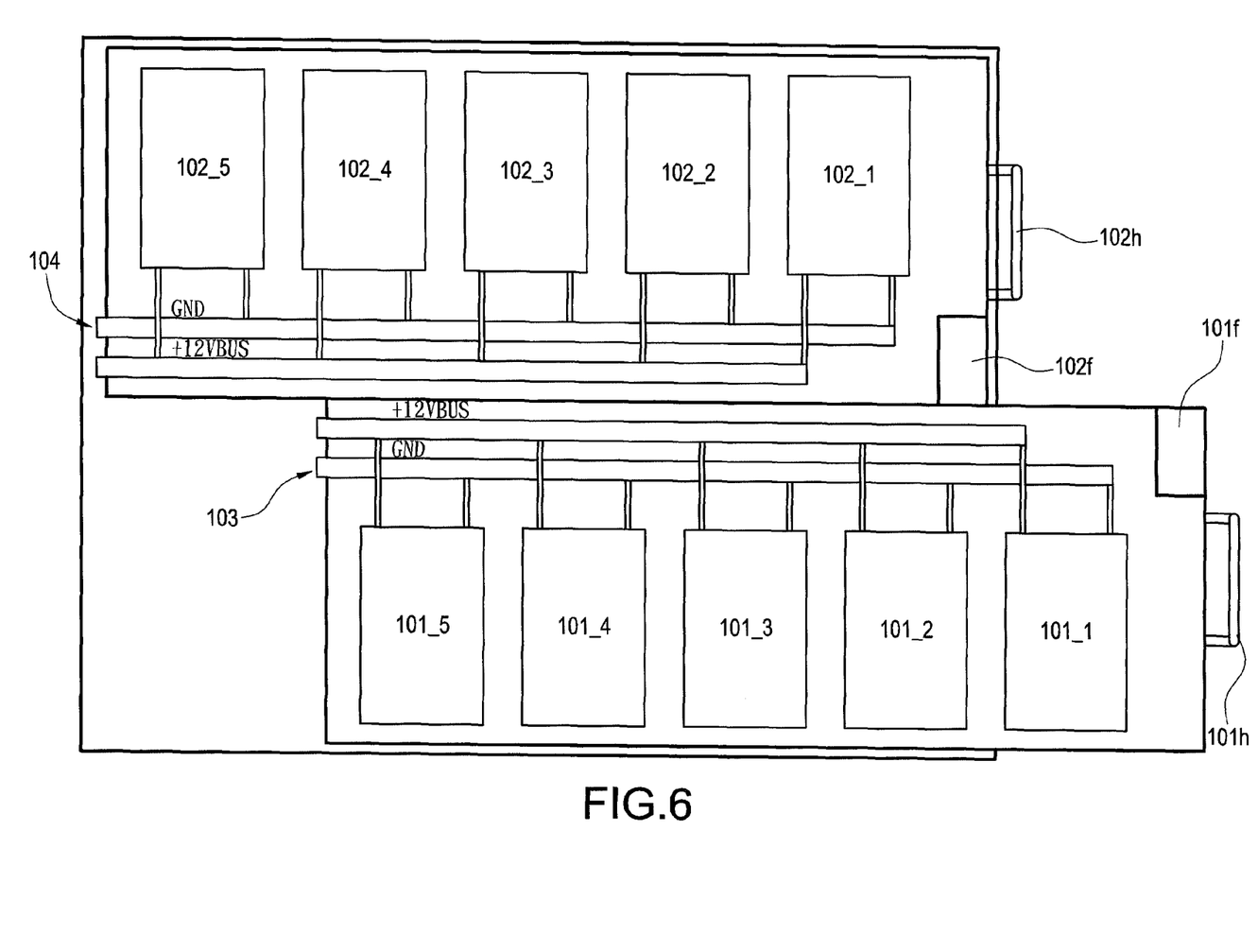
FIG. 6 is a schematic view of providing a hot-plugging operation of the array-type battery power management apparatus according to the present invention.

Reference is made to FIG. 5 and FIG. 6 which are a schematic view of the array-type battery power management apparatus and a schematic view of providing a hot-plugging operation of the array-type battery power management apparatus according to the present invention. For the convenience of explanation, the array-type battery power management apparatus with two battery power management apparatuses is exemplified for further demonstration. As shown in FIG. 5, each battery power management apparatus further has a holding portion 101h, 102h for providing a hot-plugging operation. Hence, once any one of the battery power integration units of the battery power management apparatuses 101, 102 is in fault, the holding portions 101h, 102h are used to draw out the battery power management apparatuses 101, 102 with the faulty battery power integration unit by the hot-plugging operation without shutting down the whole system. Afterward, the battery module 60 and the charging-discharging module 80 are separated by unlocking the screws locked between the battery module 60 and the charging-discharging module 80 to replace or repair the faulty battery module 60 or charging-discharging module 80.

In addition, each battery power management apparatus further has a fan 101f, 102f for providing a cooling heat-dissipating operation by providing air in an air channel formed by the first bus unit 103 and the second bus unit 104.

The output power control of the array-type battery power management apparatus is described as following. The array-type battery power management apparatus of the present invention provides a redundant backup power supply to maintain the normal power supply when any one of the battery power management apparatuses is in fault. Note that, each battery power management apparatus 101, 102 of the array-type battery power management apparatus 10 provides the output power which is greater than or equal to the required power of the external load unit 30. For the convenience of explanation, assumed power values are exemplified for further demonstration. It is assumed that each battery power integration unit can provide 1,200 watts output power. That is, the battery power management apparatus can provide 6,000 watts maximum output power if the battery power management apparatus includes five battery power integration units, but not limited. Also, the array-type battery power management apparatus can provide 12,000-watt rated output power if the array-type battery power management apparatus has two battery power management apparatuses. In other words, the maximum output power of the battery power management apparatus is determined based on the amount of the battery power integration unit of the battery power management apparatus. For instance, the battery power management apparatus can provide 4,800-watt rated output power when the battery power management apparatus has four 1,200-watt battery power management apparatuses.

Furthermore, two different control manners for the redundant power supply of the array-type battery power management apparatus in the present invention will be described as follows. It is assumed that the required power of the external load unit is 5,000 watts so that each battery power management apparatus needs to install five battery power integration units if each battery power integration unit can provide 1,200 watts output power.

1. The (two) battery power management apparatuses are simultaneously supplied by using a current-sharing control manner. Hence, each battery power management apparatus equally provides the required output power of the external load unit. In this example, each battery power management apparatus provides 2,500 watts output power and each battery power integration unit equally provides 500 watts output power.

2. The (two) battery power management apparatuses are alternately supplied by using a switching control manner. Hence, each battery power management apparatus provides all of the required output power of the external load unit. In this example, each battery power management apparatus provides 5,000 watts output power in turn and each battery power integration unit equally provides 1,000 watts output power. In particular, it is also to use only one battery power management apparatus to provide the required output power of the external load unit by disable other battery power management apparatus.

In conclusion, the present invention has following advantages:

1. The battery module and the charging-discharging module are integrated to form the battery power integration unit, thus saving wire material costs and simplifying wire process; and 2. The flexible electric energy control is implemented to increase efficiency of power supply, further the redundant power supply is provided to maintain the normal power supply when any one of the battery power management apparatus is in fault.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An array-type battery power management apparatus comprising:

at least two battery power management apparatuses, each battery power management apparatus comprising:
a bus unit having a positive bus and a negative bus; and
at least one battery power integration unit comprising:
a battery module having a first positive conductive terminal and a first negative conductive terminal, the first positive conductive terminal and the first negative conductive terminal being separated by a first distance; and
a charging-discharging module having a second positive conductive terminal and a second negative conductive terminal, the second positive conductive terminal and the second negative conductive terminal being separated by a second distance; the first distance is substantially equal to the second distance so that the second positive conductive terminal is directly connected to the first positive conductive terminal and the second negative conductive terminal is directly connected to the first negative conductive terminal, thus electrically connecting the battery module to the charging-discharging module,
wherein, the first positive conductive terminal of the battery module and the second positive conductive terminal of the charging-discharging module are electrically connected to the positive bus of the bus unit; the first negative conductive terminal of the battery module and the second negative conductive terminal of the charging-discharging module are electrically connected to the negative bus of the bus unit; each battery power management apparatus provides an output power which is greater than or equal to required power of an external load unit.

2. The array-type battery power management apparatus of claim 1, wherein the first positive conductive terminal of the battery module is locked to the second positive conductive terminal of the charging-discharging module by a screw; the first negative conductive terminal of the battery module is locked to the second negative conductive terminal of the charging-discharging module by a screw.

3. The array-type battery power management apparatus of claim 1, wherein the positive bus of the bus unit is further electrically connected to a positive terminal of an external DC voltage and a positive terminal of the external load unit; the negative bus of the bus unit is further electrically connected to a negative terminal of the external DC voltage and a negative terminal of the external load unit.

4. The array-type battery power management apparatus of claim 3, wherein the bus unit provides a bi-directional charging-discharging path; the charging-discharging module receives the external DC voltage via the positive bus and the negative bus and converts a voltage level of the external DC voltage to charge the battery module when the battery module of the battery power integration unit provides a charging operation; the charging-discharging module receives a battery voltage provided from the battery module and converts a voltage level of the battery voltage to supply the external load unit via the positive bus and the negative bus when the battery module of the battery power integration unit provides a discharging operation.

5. The array-type battery power management apparatus of claim 4, wherein the charging-discharging module is a DC-to-DC converter for providing a step-up or step-down operation of the external DC voltage or the battery voltage.

6. The array-type battery power management apparatus of claim 1, wherein each battery power management apparatus further comprising:
a holding portion providing a hot-plugging operation; and
a fan providing a cooling heat-dissipating operation.

7. The array-type battery power management apparatus of claim 1, wherein the positive bus and the negative bus of the bus unit are a copper bus bar, respectively.

8. The array-type battery power management apparatus of claim 1, wherein an amount of the battery power integration unit of each battery power management apparatus is determined according to a rated output power of the battery power management apparatus.

9. The array-type battery power management apparatus of claim 1, wherein the battery power management apparatuses are simultaneously supplied by using a current-sharing control manner.

10. The array-type battery power management apparatus of claim 1, wherein the battery power management apparatuses are alternately supplied by using a switching control manner.

* * * * *